(12) United States Patent
Bernard et al.

(10) Patent No.: US 7,103,073 B2
(45) Date of Patent: Sep. 5, 2006

(54) OPTICAL LINE TERMINATION, PASSIVE OPTICAL NETWORK, AND METHOD AND APPARATUS FOR PERFORMANCE MONITORING

(75) Inventors: Marc R. Bernard, Pembroke Pines, FL (US); Andrew E. Khaleel, Sunrise, FL (US); Luiz A. Izola, Miami Lakes, FL (US); Nora Herndon, Coral Springs, FL (US); Kerry J. Neef, Weston, FL (US)

(73) Assignee: Advanced Fibre Communications, Inc., Petaluma, CA (US)

( * ) Notice: Subject to any disclaimer, the term of this patent is extended or adjusted under 35 U.S.C. 154(b) by 23 days.

(21) Appl. No.: 10/783,716

(22) Filed: Feb. 19, 2004

(65) Prior Publication Data
US 2005/0185631 A1   Aug. 25, 2005

(51) Int. Cl.
*H04J 3/06* (2006.01)

(52) U.S. Cl. .................. 370/503; 370/350; 370/216; 398/24

(58) Field of Classification Search ............... 370/350, 370/503, 412, 241, 395.5, 468, 324, 442, 370/516; 709/219, 224; 702/179, 187, 182, 702/184, 185, 183; 398/9, 17, 25, 30, 33
See application file for complete search history.

(56) References Cited

U.S. PATENT DOCUMENTS

| | | | |
|---|---|---|---|
| 6,262,997 B1 * | 7/2001 | Quayle ..................... 370/503 |
| 6,470,032 B1 * | 10/2002 | Dudziak et al. ............ 370/503 |
| 6,700,903 B1 * | 3/2004 | Boyd et al. ................ 370/503 |
| 6,708,137 B1 * | 3/2004 | Carley ........................ 702/179 |
| 2004/0196892 A1 * | 10/2004 | Song et al. |

* cited by examiner

*Primary Examiner*—Hanh Nguyen
(74) *Attorney, Agent, or Firm*—Pillsbury Winthrop Shaw Pittman LLP

(57) ABSTRACT

A method of performance monitoring according to an embodiment of the invention includes, in a passive optical network (PON), sending system time of an optical line termination (OLT) to an optical network unit (ONU). The method further includes retrieving, by the OLT, network data collected at the ONU and associated with the sent OLT system time. The retrieved network data is stored at the OLT.

2 Claims, 10 Drawing Sheets

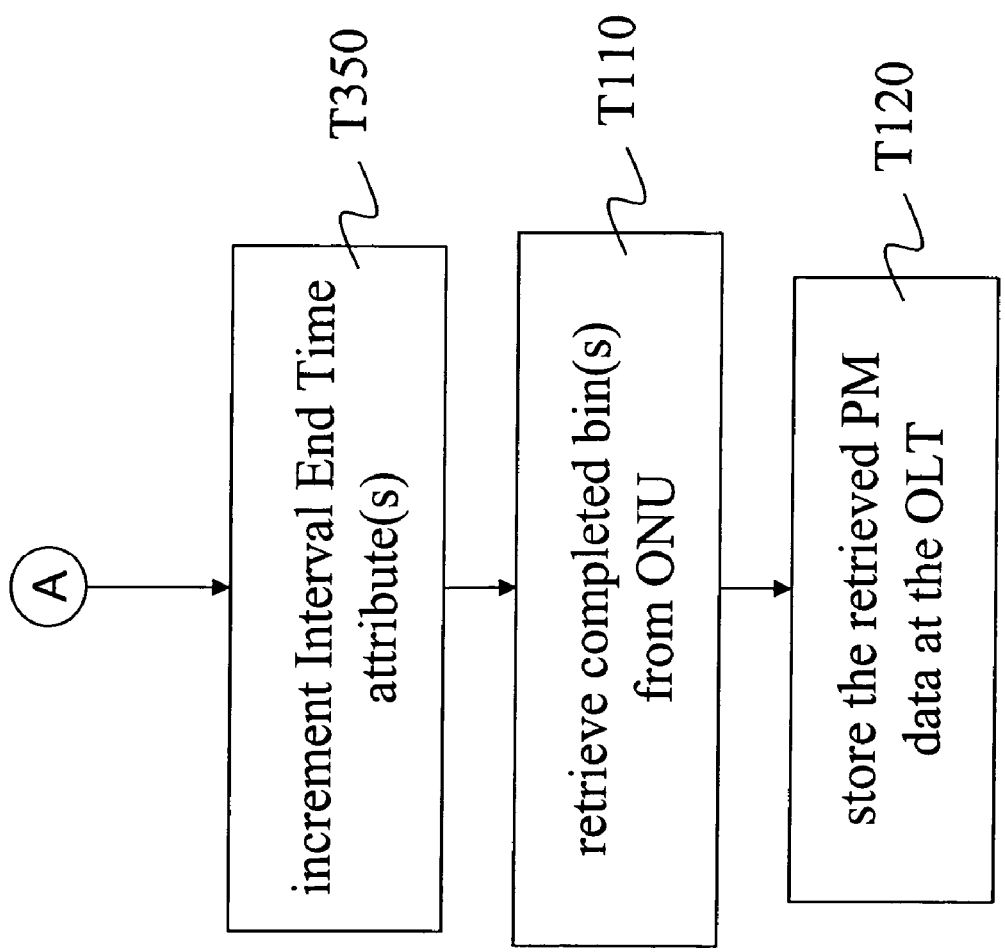

OPTICAL LINE TERMINATION, PASSIVE OPTICAL NETWORK, AND METHOD AND APPARATUS FOR PERFORMANCE MONITORING

FIELD OF THE INVENTION

The invention relates to communications networks.

BACKGROUND

The following acronyms may appear in the description below: APON, asynchronous transfer mode (ATM) passive optical network (PON); ASIC, application-specific integrated circuit; ATM, asynchronous transfer mode; B-PON or BPON (broadband PON); CATV, community access television (cable television); CPU, central processing unit (e.g. microprocessor); EPON (Ethernet PON); FPGA, field-programmable gate array; ISDN, integrated services digital network; PON, passive optical network; POTS, plain old telephone service; PPV, pay per view; RAM, random-access memory; ROM, read-only memory; VoIP, voice over Internet Protocol; VoATM, voice over ATM; VoD, video on demand.

Optical access systems offer a potentially large bandwidth as compared to copper-based access systems. A broadband optical access system may be used, for example, to distribute a variety of broadband and narrowband communication services from a service provider's facility to a local distribution point and/or directly to the customer premises. These communication services may include telephone (e.g. POTS, VoIP, VoATM), data (e.g. ISDN, Ethernet), and/or video/audio (e.g. television, CATV, PPV, VoD) services.

FIG. 1 shows examples of two optical access network (OAN) architectures. The first example includes an optical line termination (OLT), an optical distribution network (ODN), an optical network unit (ONU), and a network termination (NT). The OLT provides the network-side interface of the OAN (e.g. a service node interface or SNI), and it may be located at a carrier's central office or connected to a central office via a fibre trunk (e.g. the OLT may include an OC-3/STM-1 or OC-12c interface).

The OLT may be implemented as a stand-alone unit or as a card in a backplane. The AccessMAX OLT card of Advanced Fibre Communications (Petaluma, Calif.) is one example of a superior OLT product. Other examples of OLTs include the 7340 line of OLTs of Alcatel (Paris, France), the FiberDrive OLT of Optical Solutions (Minneapolis, Minn.), and assemblies including the TK3721 EPON media access controller device of Teknovus, Inc. (Petaluma, Calif.). The OLT may communicate (e.g. via cable, bus, and/or data communications network (DCN)) with a management system or management entity, such as a network element operations system (NE-OpS), that manages the network and equipment.

On the user side, the OLT may be connected to one or more ODNs. An ODN provides one or more optical paths between an OLT and one or more ONUs. The ODN provides these paths over one or more optical fibres which may have lengths measured in feet or in kilometers. The ODN may also include optional protection fibres (e.g. for backup in case of a break in a primary path).

An optical network unit (ONU) is connected to an ODN and provides (either directly or remotely) a user-side interface of the OAN. The ONU, which may serve as a subscriber terminal, may be located outside (e.g. on a utility pole) or inside a building. One or more network terminations (NTs) are connected to an ONU (e.g. via copper trace, wire, and/or cable) to provide user network interfaces (UNIs), e.g. for services such as Ethernet, video, and ATM. Implementations of such an architecture include arrangements commonly termed Fibre to the Building (FTTB), Fibre to the Curb (FTTC), and Fibre to the Cabinet (FTTCab).

One example of an ONU includes the XN230 APON media access controller device of BroadLight Ltd. (Ramat-Gan, Isreal) combined with an external CPU (and possibly other devices including an optoelectronic interface and interfaces for one or more of ATM, Ethernet, T1, video, and POTS). The XN230 device may be used to provide up to five logical ONUs. Another example of an ONU includes the MC92701 BPON layer termination device of Motorola Inc. (Schaumberg, Ill.) combined with an external CPU.

The second architecture example in FIG. 1 includes an OLT, an ODN, and one or more optical network terminations (ONTs). An ONT is an implementation of an ONU that includes a user port function. The ONT, which may be active, serves to decouple the access network delivery mechanism from the distribution at the customer premises (e.g. a single-family house or a multi-dwelling unit or business establishment). Implementations of such an architecture include arrangements commonly termed Fibre to the Home (FTTH). In some applications, an ONT may be wall-mounted.

The AccessMAX ONT of Advanced Fibre Communications (Petaluma, Calif.) is one example of a superior ONT product. Other examples of ONTs include the Exxtenz ONT of Carrier Access Corporation (Boulder, Colo.), the FiberPath 400 and 500 lines of ONTs of Optical Solutions, the 7340 line of ONTs of Alcatel, and assemblies including the TK3701 device of Teknovus, Inc.

As shown in FIG. 1, an OAN may include a number of ODNs connected to the same OLT. As shown in FIG. 2, an ODN may connect an OLT to multiple ONUs. An ODN may also be connected to both ONUs and ONTs. In some applications, the nominal bit rate of the OLT-to-ONU signal may be selected from the rates 155.52 Mbit/s and 622.08 Mbit/s.

An ODN that contains only passive components (e.g. fibre and optical splitters and/or combiners) may also be referred to as a passive optical network (PON). Depending e.g. on the particular intended application, a PON may also be referred to as a B-PON (broadband PON), EPON (Ethernet PON), or APON (ATM PON). A OAN may include different OLTs and/or ONUs to handle different types of data traffic (e.g. Ethernet, ATM, video), and/or a single OLT or ONU may handle more than one type of data traffic. The OLT and/or one or more of the ONUs may be provided with battery backup (e.g. an uninterruptible power supply (UPS)) in case of mains power failure.

FIG. 3 shows an example of a OLT connected to a PON that includes a four-way splitter 20 and four eight-way splitters 30a–d. In this example, each of up to thirty-two ONUs may be connected to the PON via a different output port of splitters 30a–d (where the small circles represent the PON nodes depending from these ports). Other PON configurations may include different splitter arrangements. In some such configurations, for example, a path between the OLT and one ONU may pass through a different number of splitters than a path between the OLT and another ONU.

The protocol for communications between the OLT and the ONUs may be ATM-based (e.g. such that the OLT and ONUs provide transparent ATM transport service between the SNI and the UNIs over the PON), although embodiments of the invention as disclosed herein may also be applied to optical access networks in which such communications are based on other protocols (e.g. Ethernet). Embodiments of the invention may also be applied to optical access systems that comply with one or more of ITU-T Recommendations G.983.1 ("Broadband optical access systems based on Passive Optical Networks (PON)," dated October 1998 and as corrected July 1999 and March 2002 and amended November 2001 and March 2003, along with Implementor's Guide of October 2003) and G.983.2 ("ONT management and control interface [OMCI] specification for B-PON," dated June 2002 and as amended March 2003, along with Implementor's Guide of April 2000) (International Telecommunication Union, Geneva, CH). Additional aspects of optical access systems to which embodiments of the invention may be applied are described in the aforementioned Recommendations.

SUMMARY

A method of data transfer according to one embodiment of the invention includes transmitting, to an optical network unit (ONU), an indication of a time relative to a current system time. The method further includes receiving network data collected at the ONU in accordance with the transmitted indication. The received network data is stored.

An optical line termination (OLT) according to an embodiment of the invention includes a transmitter, a receiver, and a storage device. The transmitter is configured to transmit, to an ONU, an indication of a time relative to a current system time. The receiver is configured to receive network data collected at the ONU in accordance with the transmitted indication. The storage device is configured to store the received network data.

BRIEF DESCRIPTION OF THE DRAWINGS

FIGS. 6A & 6B show a flowchart of an implementation of the methods shown in FIGS. 4 and 5.

DETAILED DESCRIPTION

Figure 1:
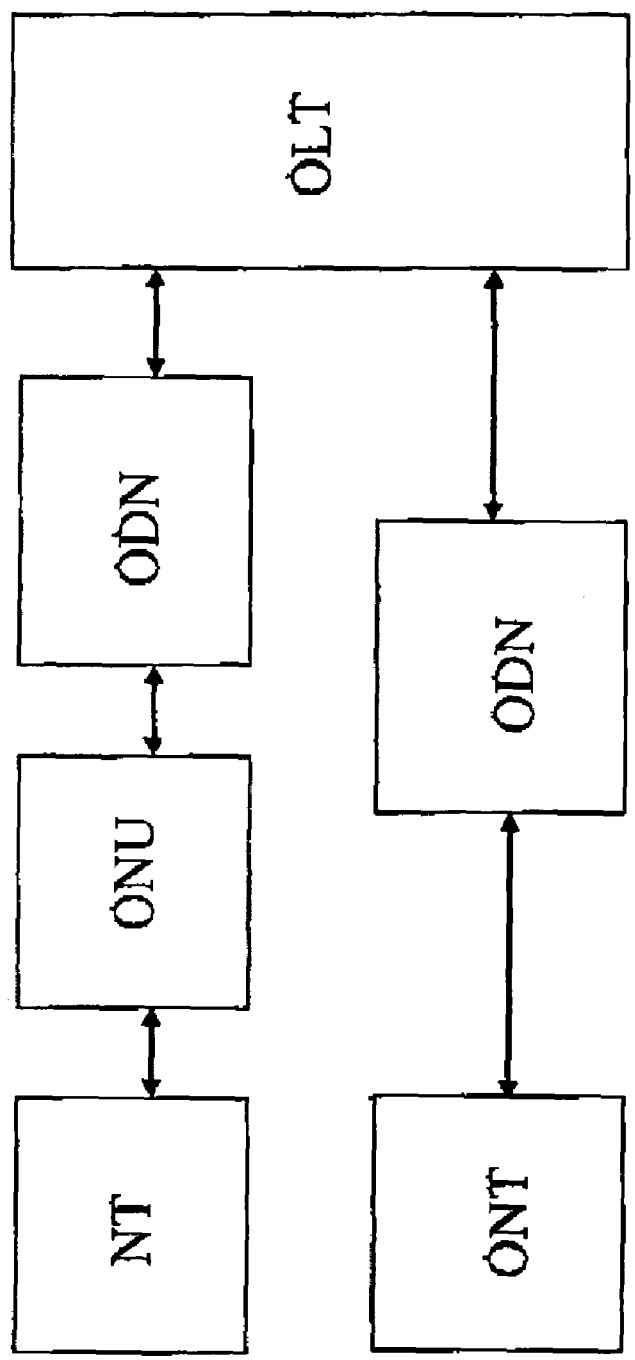
FIG. 1 shows examples of two OAN architectures.
Figure 2:
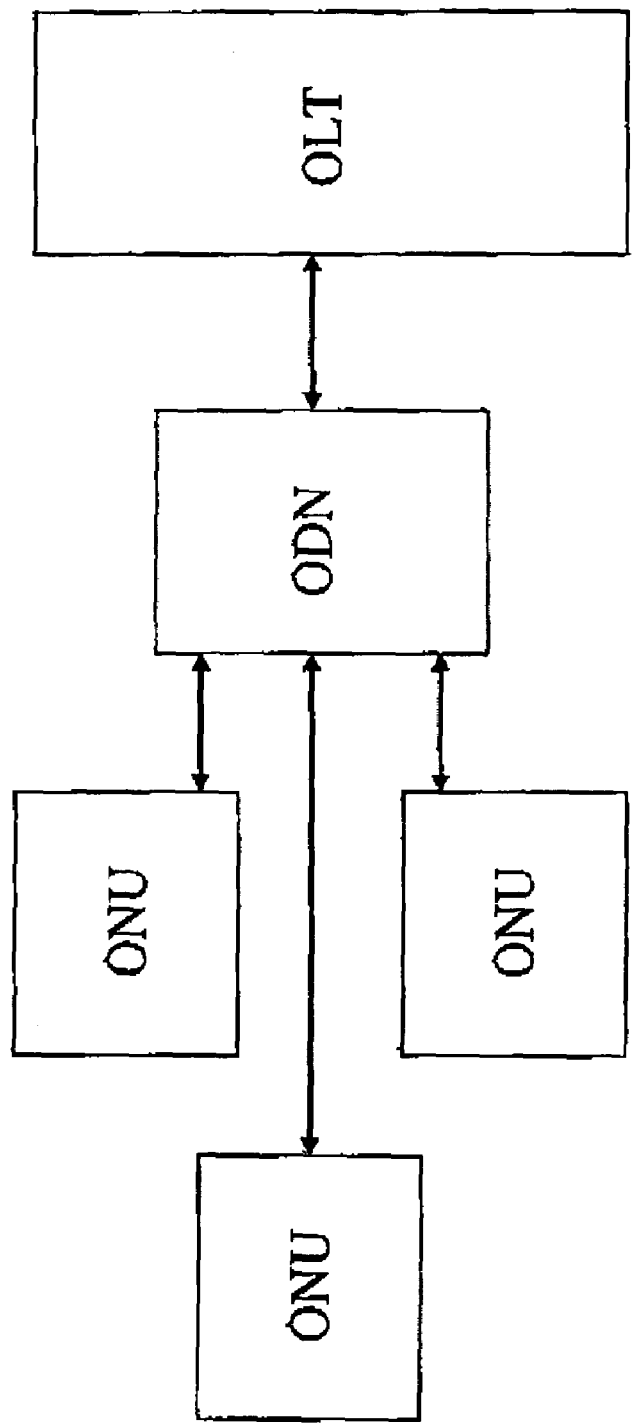
FIG. 2 shows an example of an OAN.
Figure 3:
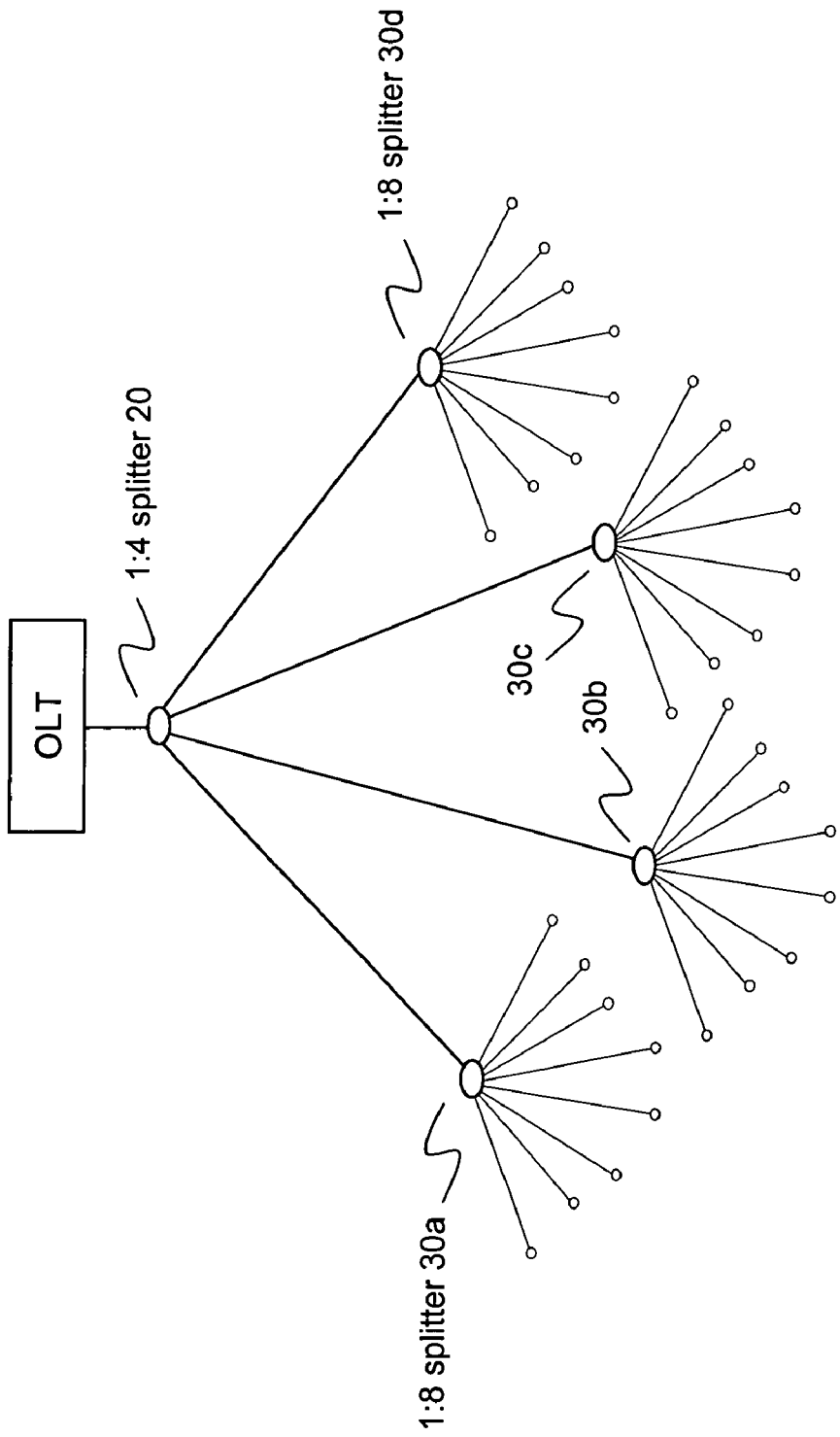
FIG. 3 shows an example of an OLT and a PON including splitters.

In general, optical network units (ONUs) may be configured to continuously monitor operational parameters, such as performance parameters relating to various aspects of the traffic and/or equipment, and collect values of such parameters. Such collected network data may be useful to architects, service providers, and other operators of a passive optical network (PON).

Embodiments of the invention include methods and apparatus for retrieving such collected data and storing the data at an optical line termination (OLT) for future use.

In particular, an optical line termination (OLT) may be configured to send OLT system time to an optical network unit (ONU). In accordance with the OLT system time, the ONU may be configured to collect performance monitoring (PM) data. The OLT may be further configured to retrieve and store the PM data collected by the ONU. The stored PM data may be useful to a management function or other entity.

According to ITU-T G.983.2 cited above, an ONU has no knowledge of OLT system time. In contrast, embodiments of the invention provide OLT system time to an ONU. As such, the ONU can associate collected PM data with actual system time. Thus, discrepancies between the ONU local clock and OLT system time can be identified. Such discrepancies might stem from drift, a bad clock, and/or a malfunction in the ONU or OLT. In addition, the sent OLT system time may be used for debugging, troubleshooting, and/or other features needed or desired by an entity (e.g., a vendor) or specified in a standard or other technical specification.

Also under G.983.2, an ONU can collect PM data only for current and previous 15-minute intervals. In contrast, embodiments of the invention enable the collection and storage of a much greater body of historical data. For instance, an OLT can be configured to store a daily and/or previous three days' dataset. Subject to hardware constraints, an arbitrarily large body of data may be stored.

Moreover, by storing PM data at the OLT, embodiments of the invention may achieve improved reliability and response time for requests for PM data that are issued by an entity, such as an element management system (EMS) of a PON or a NE-OpS. Such improvements may result because the entity need not request data directly from an ONU, incurring associated delays as messages flow both through the OLT system messaging system within the OLT, and over the standard OMCI protocol of G.983.2 to and from the ONU. Additionally, storage of PM data at the OLT may safeguard such data from loss, for the OLT equipment, unlike a particular ONU, may be in a protection group. Once placed into service at a location remote from an OLT or management system of a PON, a particular ONU may only be infrequently physically examined by a service provider. In contrast, an OLT may be more closely monitored by the service provider in order to preempt loss of data. Thus, storage of PM data at the OLT may better ensure that historical data remains intact even if the ONU reboots or is otherwise lost.

Certain embodiments herein illustrate interactions between one OLT and one ONU of a passive optical network (PON). It is to be appreciated that, in other embodiments, multiple OLTs and ONUs may interact. For instance, an OLT may store PM data retrieved from multiple ONUs.

Implementations of various embodiments herein may optionally conform in some respects to ITU-T G.983.2 cited above, to T1.231-1997 ("Digital hierarchy—layer 1 in-service digital transmission performance monitoring," dated September 1997) (American National Standards Institute, Washington, D.C.), and/or to GR-820-CORE ("Generic digital transmission surveillance," issue 2, dated December 1997) (Telcordia Technologies, Inc., Piscataway, N.J.).

Figure 4:
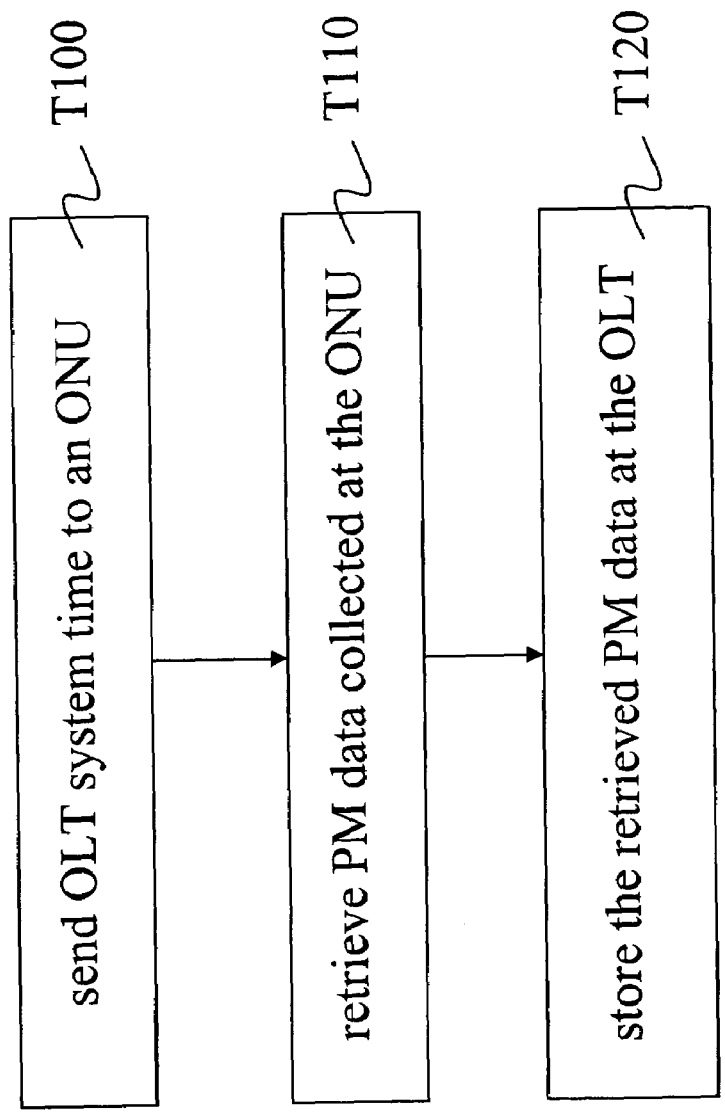
FIG. 4 shows a flowchart of a method according to an embodiment of the invention.

FIG. 4 shows a flowchart of a method of performance monitoring according to an embodiment of the invention. The method shows tasks performed at an OLT. In particular, task T100 sends OLT system time to an ONU, such as an optical network termination (ONT). OLT system time may be communicated to the ONU at startup (e.g., a cold/warm boot), during an OLT system time change, or after each period of PM data collection and retrieval, for example. An OLT system time change may follow, for example, a ranging operation that quantifies a time delay for transmissions in the PON. Ranging operations may be performed at regular (e.g., about every fifteen minutes) and/or irregular intervals. An irregular interval may depend on the occurrence of one or more events, such as rebooting of an ONU or resumption of communication between an OLT and an ONU following an interruption.

Subsequent to task T100, task T110 retrieves PM data collected at the ONU. Task T120 stores the retrieved PM data at the OLT. The retrieved PM data may be stored on a PON card, management system device, and/or control card. In an embodiment, the PM data is stored redundantly in another location, such as in nonvolatile memory of a card or other storage device (e.g., IDE hard-disk drive) local to or remote from the OLT.

The PM stored data at the OLT may be provided to a management system or entity, which may be operated by a service provider. In an integrated system such as a cabinet having one or more backplanes, the management system may include a control card or card assembly inserted into a backplane, and the OLT may include another card or card assembly inserted into the same or a different backplane. Such a backplane may include a standardized bus (e.g. ISA, PCI, VME, VxI) and/or a proprietary or otherwise non-standardized bus. Alternatively, the management system or entity may be external to the OLT and associated equipment, comprising for example, a command-line interface (CLI) or operational support system (OSS).

Figure 5:
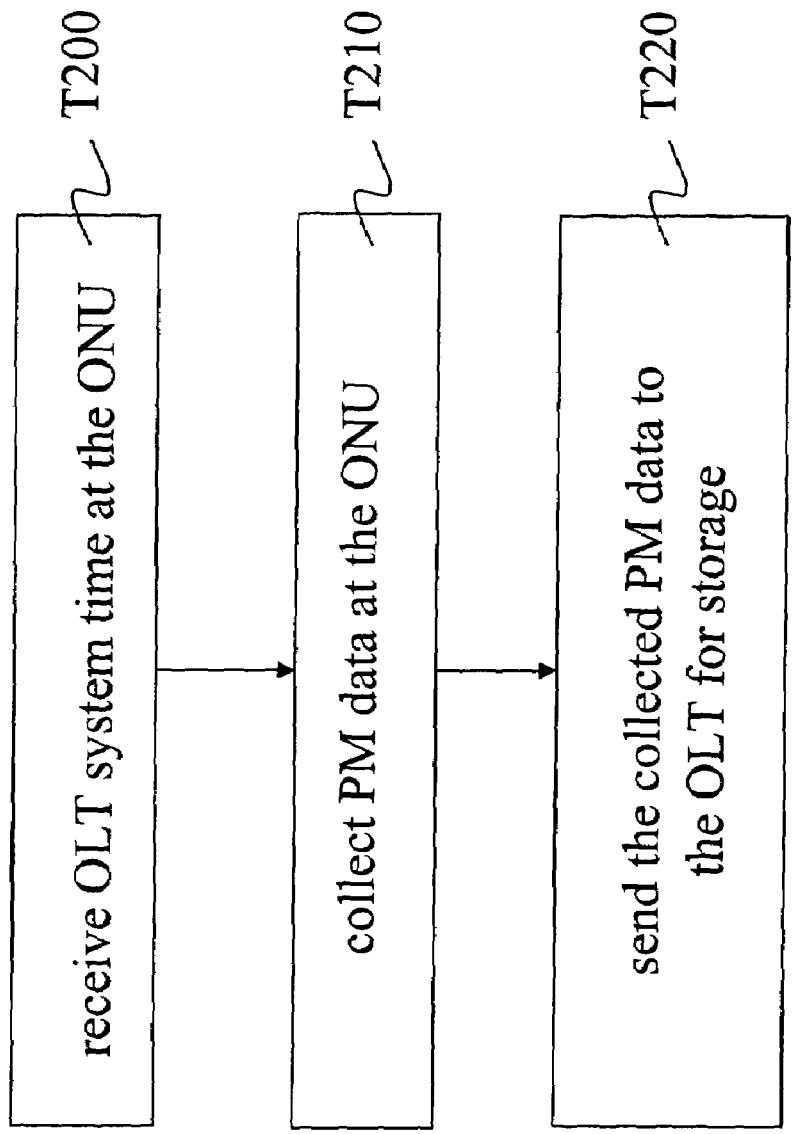
FIG. 5 shows a flowchart of a method according to an embodiment of the invention.

FIG. 5 shows a flowchart of a method of performance monitoring according to an embodiment of the invention. FIG. 5 is a counterpart to FIG. 4, showing tasks performed at the ONU. Task T200 receives OLT system time at the ONU. Task T210 then collects PM data at the ONU. Task T220 sends the collected PM data to the OLT for storage.

Figure 6A:
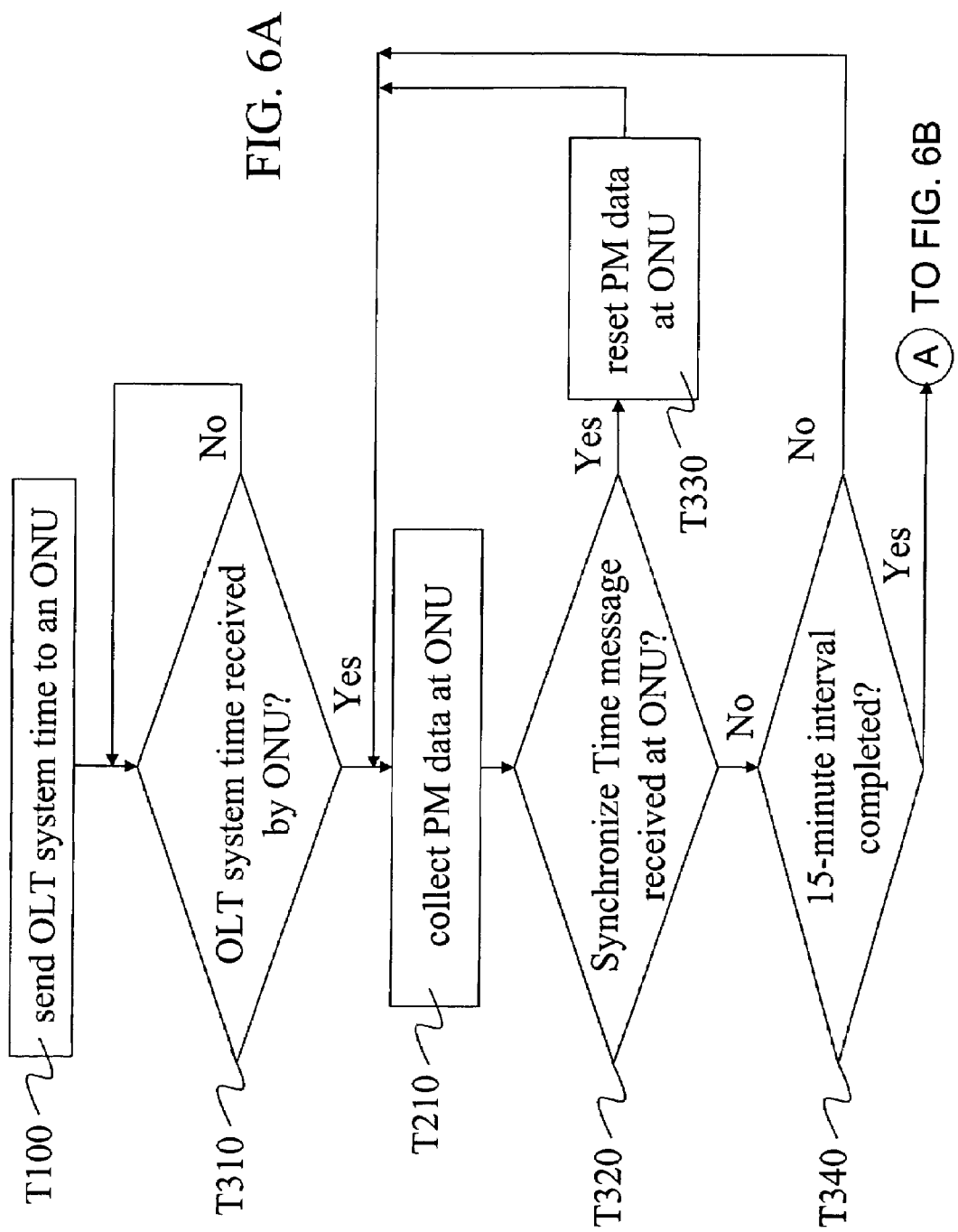

FIGS. 6A and 6B show a flowchart of an implementation of the methods shown in FIGS. 4 and 5. Task T100 sends OLT system time to an ONU. The OLT system time may be indicated in any of a number of ways. For instance, the OLT system time may be an offset with respect to a reference event (e.g., number of seconds since OLT boot-up) or a reference date (e.g., number of seconds since start of the year 1992). Alternatively, the OLT system time may track the time of day (e.g., 13:29:45), and may be provided to the OLT by an internal or external clock.

The OLT system time may be sent immediately after a ranging operation (e.g., during a provisioning stage). Task T310 determines whether OLT system time has been received by the ONU. If OLT system time has been received, then task T210 collects PM data at the ONU.

In an example implementation, PM data is collected in 15-minute intervals and associated with an Interval End Time attribute. In particular, the ONU may maintain a current 15-minute bin (also termed "bucket" or "counter") for each parameter (or set thereof) monitored by the ONU, as well as a historical 15-minute bin containing the most-recently-completed 15 minutes of PM data for each PM parameter. Such collection may conform in some, all, or no respects to ITU-T G.983.2 cited above.

Various kinds of network data may be collected by an ONU. In particular, PM data collected by an ONU may include data corresponding to parameters described in ITU-T G.983.2 and/or to other parameters. For instance, in accordance with G.983.2 (see, e.g., sections 7.3.9, 7.3.10, 7.3.11, 7.3.15, 7.3.16, 7.3.28, 7.3.35, and 7.3.37), an ONU may monitor the following managed entities, which represent various operational aspects of resources and services in an ONT: UPC Disagreement Monitoring History DataAPON; AAL1 Protocol Monitoring History DataAPON; AAL5 Protocol Monitoring History DataAPON; Ethernet Performance Monitoring History Data; CES Physical Interface Monitoring History Data; TC Adapter Protocol Monitoring History Data; AAL2 CPS Protocol Monitoring History Data APON; Priority Queue APON; MAC Bridge PM History Data; MAC Bridge Port PM History Data; Voice PM History Data; and VP PM History Data.

A Synchronize Time action may be used to synchronize the start time of all monitored parameters of the ONU with the system time of the OLT and to reset the registers of the parameters. The effect of this action, which may be initiated by the OLT, is to set all counters of all monitored parameters to 0x00 at the ONU and to restart counting. Also, the value of the Interval End Time attribute of each parameter (or set thereof) is reset to 0x00.

The Interval End Time attribute identifies the most-recently-completed 15-minute interval. It may be a cyclic counter (modulo 0xFF (255)) that is incremented each time a new interval is completed (i.e., at the end of each 15-minute interval). For example, the value of this attribute may be 0x00 during the first 15-minute interval that begins with the reception of a Synchronize Time action (described above). The value is 0x01 during the first succeeding period, and so on. If a set of parameters is created after the reception of the Synchronize Time action, the value of the associated Interval End Time attribute is set equal to the number of the last completed interval, and PM counters of the parameters start counting immediately.

In an embodiment of the invention, the ONU, which has knowledge of the OLT system time, maintains the 15-minute bins on the quarter hour, i.e., from 12:00 to 12:15, from 12:15 to 12:30, etc. In a particular implementation, the start of each 15-minute count should be accurate to within ±10 seconds with respect to the OLT clock. For example, a 15-minute register may begin its 2:00 count between 1:59:50 and 2:00:10.

Embodiments of the invention also provide the ability at the ONU to associate the Interval End Time with a given 15-minute bin that is in line with each quarter hour. Thus, if the ONU begins collecting PM data at 2:07, then the Interval End Time attribute is set to 0x00 until 2:15, at which point the new (i.e., current) 15-minute bin is associated with an Interval End Time of 0x01.

The counters used for ONU-specific performance monitoring may be locked to the OLT system time-of-day clock. A change in the OLT system time-of-day clock results in a change to the current 15-minute timing period, if the new clock is outside of the 15-minute interval. For example, for a particular timing period, if the Interval End Time attribute corresponds to 11:30, and the system clock is subsequently changed from 11:37 to 11:47, then the Interval End Time attribute is changed to a value corresponding to 11:45.

Returning to FIG. 6A, task T320 determines whether a Synchronize Time message has been received at the ONU. If so, then task T330 resets all PM counters upon request by the OLT, including the current 15-minute bins and the most-recently-completed 15-minute bins. If the ONU loses and regains communications with the OLT, i.e., goes through re-ranging, then all PM data is reset. In an alternative embodiment, PM data may continue to be collected so long as the OLT system time is known by the ONU and a drift does not occur until the next time the ONU is ranged by the OLT. Such an embodiment may be useful if the ONU momentarily loses communication with the OLT. However, if an ONU is being replaced with another ONU, or with an ONU of another ONU type, it may be useful to start collecting PM data from scratch.

Task T340 determines whether a 15-minute interval has been completed. If not, data continues to be collected by Task T210. If so, then task T350 (FIG. 6B) increments the Interval End Time attribute.

Tasks T340 and T350 may employ a timer, which may be implemented as a counter that counts a predetermined number of events (e.g. clock periods), as a comparator that indicates a relation between the current time and a predetermined end time, or in another fashion as is or may become known in the art of circuit design.

Task T110 retrieves the completed PM data bins from the ONU. Task T120 stores the retrieved PM data at the OLT. In an example implementation, after every 15-minute interval, the OLT retrieves (e.g., via the OMCI "GET" command of ITU-T G.983.2, Appendix II.2.11) and stores all ONU-specific performance counters for ranged ONUs. Upon request for current 15-minute data from the management system, the OLT retrieves (e.g., via the OMCI "GET Current" command of ITU-T G.983.2) the requested ONU-specific performance counters from a specified ONU and returns that information to the management system.

The OLT may store, for instance, (1) historical 15-minute bins (e.g., up to 32 bins) for some or all ONU-specific PM parameters collected by the ONU; (2) a current daily counter for each PM parameter; and (3) previous daily counters (e.g., three) for each PM parameter. The daily interval for ONU-specific PM data may be defined as midnight to midnight. Such stored data may be provided to a management system or other entity upon request.

An OLT may receive a command to reset all ONU-specific PM data for a given ONU (or all ONUs) provisioned within a given PON system. When the OLT receives such a command, the OLT may delete all PM data collected for that ONU (or all ONUs), including 15-minute bins and all daily bins.

When the OLT is restarted, whether by physical removal and re-insertion of an applicable line card, or by rebooting, including during upgrade, all ONU PM data may be maintained by a standby (e.g., redundant) card or other nonvolatile memory means, such as nonvolatile RAM. The card or other means may be local to the OLT or part of another entity, such as a management system. Alternatively, the PM data may be reset when the OLT is restarted.

When the OLT receives a system time change of more than N seconds from its current time, the OLT may reset all 15-minute-bin ONU PM data, including all daily bins of ONU PM data.

When the OLT loses communication with an ONU (e.g., an ONU is replaced by an ONU of a different type), the OLT may reset all PM data for that ONU or alternatively reset all data.

An OLT may report historical ONU PM values whether an ONU has rebooted or not, and whether a given port (e.g., an Ethernet port) on the ONU is enabled or disabled. PM data may be reset when a service provider resets the data directly from a management system or when the system time is changed.

Figure 7:
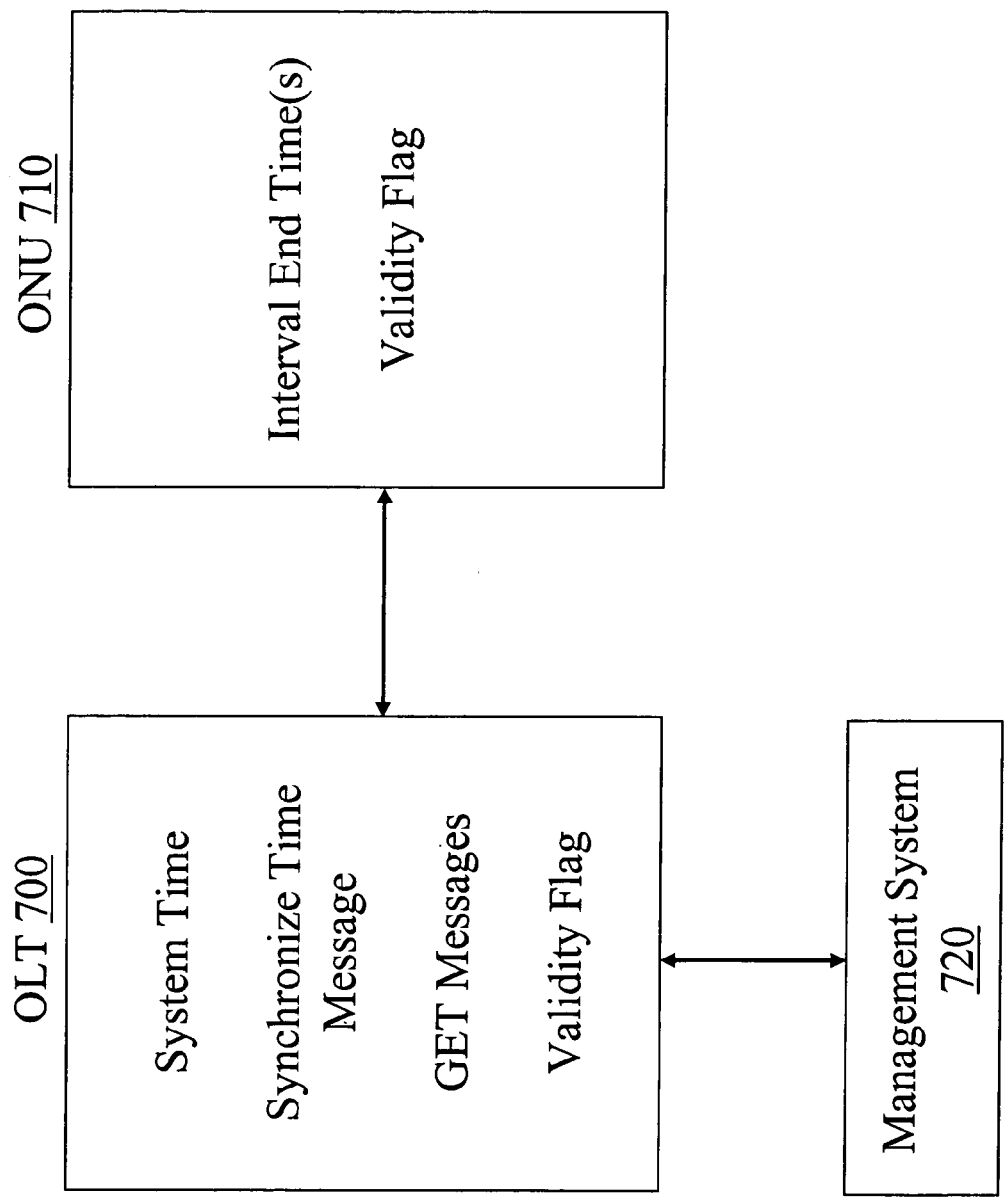
FIG. 7 shows a system according to an embodiment of the invention.

FIG. 7 shows a system according to an embodiment of the invention. The system includes an OLT 700, an ONU 710, and a management system 720. Example messages or attributes supported in OLT 700 and ONU 710 are indicated. For instance, OLT 700 sends system time, Synchronize Time messages, and GET messages, as described above.

OLT 700 also may maintain a respective validity flag for, for example, all historical 15-minute bins, the daily counter, and previous days' counter(s). For example, the validity flag may indicate the occurrence of one of three states, which are referred to below as OK, Incomplete Stats (e.g. Partial Data), and Unavailable, respectively.

The validity flag is marked as OK for an ONU-specific 15-minute bin if OLT 700 has determined that the requested data has been available for the entire 900 seconds in the 15-minute interval (i.e., the data is valid).

The validity flag is marked as Incomplete for an ONU-specific 15-minute bin if at least some data has been collected in the 15-minute interval, but the data cannot be relied upon for some reason. For instance, the validity flag may be marked as Incomplete if: (1) OLT 700 has determined that the requested data has been available for less than the entire 900 seconds in the 15-minute interval (e.g., the data is incomplete); (2) the data in the previous and recent intervals has been accumulated over a period of time that is greater or less than the nominal accumulation period duration; or (3) the data in the current interval is suspect because ONU 710 has rebooted or re-ranged.

The validity flag is marked as Unavailable if the time period to be displayed does not have data stored for it. This may be due to one of the following: (1) the system time is being changed; (2) the request is for 15-minute data that is outside of a predetermined storage interval; (3) the request is for daily data that is outside of the daily storage interval; and/or (4) the given ONU-specific 15-minute interval has been recently reset. If the system date and time are changed, then all ONU-specific PM registers collected are typically marked as Unavailable.

Returning to FIG. 7, ONU 710 may maintain the Interval End Time attribute(s) described above. Additionally, ONU 710 may maintain a validity flag for current 15-minute PM bins for all PM counters, and previous 15-minute PM bins for all PM counters. Each validity flag may be marked as (1) OK, (2) Incomplete Stats (e.g. Partial Data), or (3) Unavailable, for instance.

Figure 8:
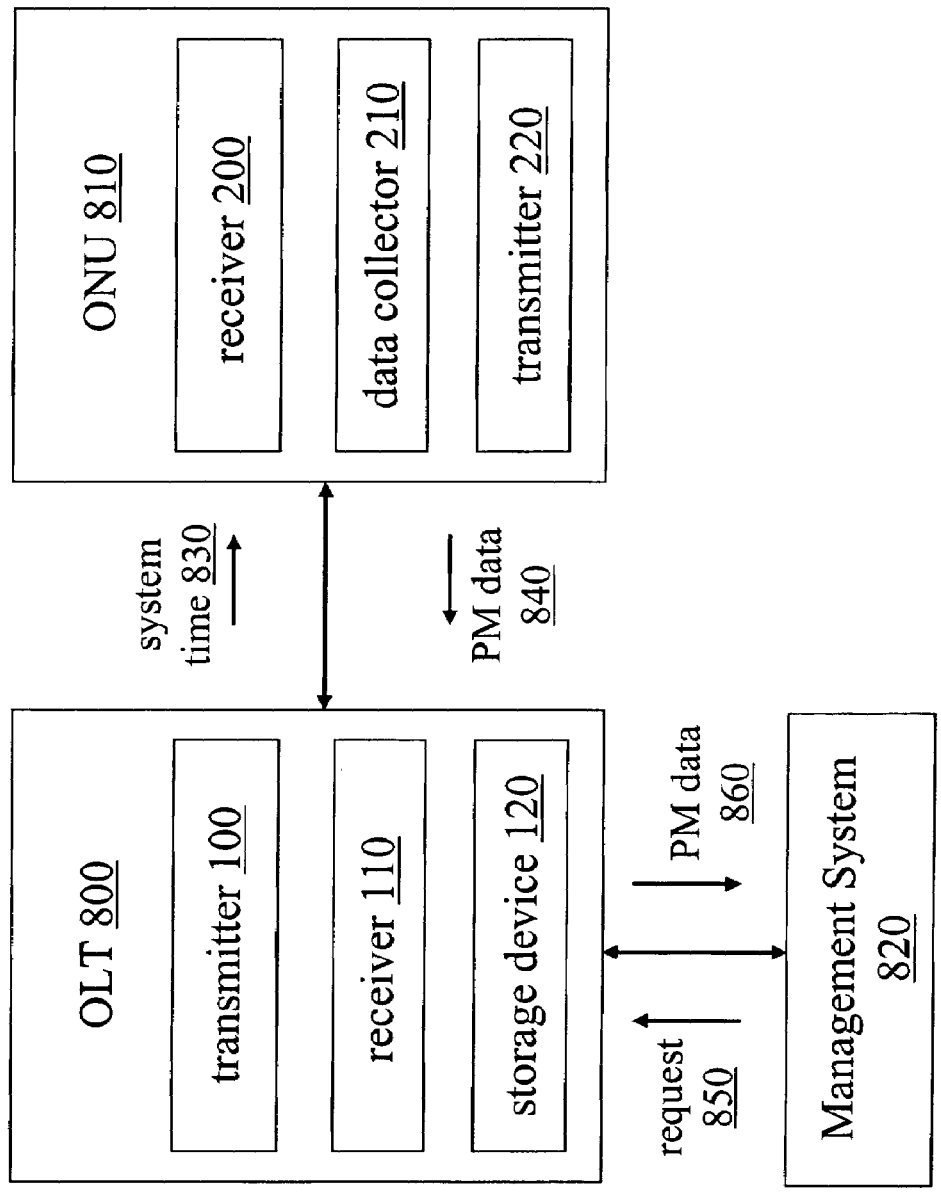
FIG. 8 shows a system according to an embodiment of the invention.

FIG. 8 shows a system according to an embodiment of the invention. The system includes an OLT 800, an ONU 810, and a management system 820.

OLT 800 includes a transmitter 100, a receiver 110, and a storage device 120. Transmitter 100 sends OLT system time 830 to ONU 810. Receiver 110 receives PM data 840 collected at the ONU 810 in accordance with the sent OLT system time 830. Storage device 120 stores the received PM data 840. Receiver 110 also receives, from management system 820, a request 850 for PM data. Transmitter 100 sends PM data 860 to management system 820 in accordance with the request.

ONU 810 includes a receiver 200, a data collector 210, and a transmitter 220. Receiver 200 receives system time 830 from OLT 800. Data collector 210 collects PM data in accordance with the received OLT system time 830. Transmitter 220 sends the collected PM data 840 to OLT 800 for storage.

It is expressly contemplated that alternative operations and/or configurations of such elements, and that apparatus including additional elements, are disclosed by and may be constructed according to the description provided herein. For instance, FIGS. 4, 5, 6A and 6B may involve additional tasks not shown therein, such as a task to initialize the Interval End Time attribute to 0x00. In a further alternative, OLT system time sent to an ONU may be used for debugging, event logging, and/or other purposes at the ONU.

The foregoing presentation of the described embodiments is provided to enable any person skilled in the art to make or use the present invention. While specific embodiments of the invention have been described above, it will be appreciated that the invention as claimed may be practiced otherwise than as described. Various modifications to these embodiments are possible, and the generic principles presented herein may be applied to other embodiments as well.

An embodiment of the invention may be implemented in part or in whole as a hard-wired circuit (e.g. implemented on a computer interface card) and/or as a circuit configuration fabricated into one or more arrays of logic elements arranged sequentially and/or combinatorially and possibly clocked (e.g. one or more integrated circuits (e.g. ASIC(s)) or FPGAs). Likewise, an embodiment of the invention may be implemented in part or in whole as a firmware program loaded or fabricated into non-volatile storage (such as read-only memory or flash memory) as machine-readable code, such code being instructions executable by an array of logic elements such as a microprocessor or other digital signal processing unit.

Figure 9:
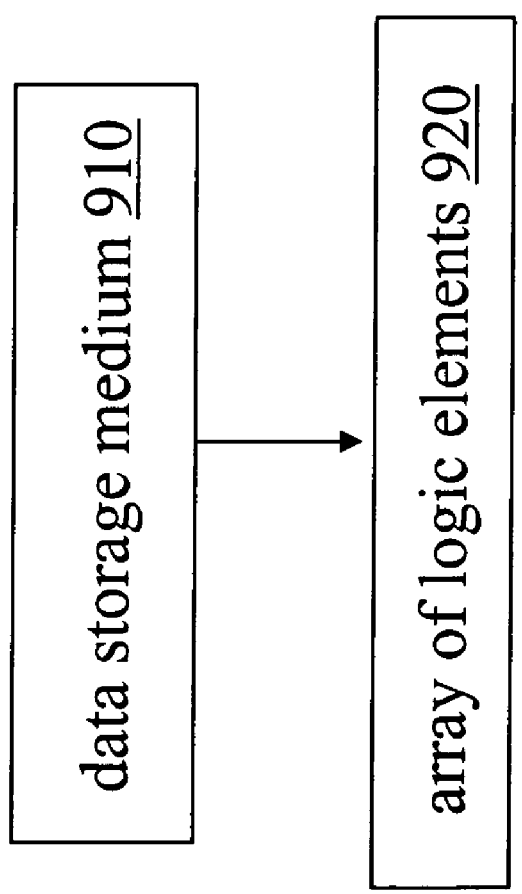
FIG. 9 shows a system including a data storage medium according to an embodiment of the invention.

Further, an embodiment of the invention may be implemented in part or in whole as a software program loaded as machine-readable code from or into a data storage medium (e.g., as shown in FIG. 9) such as a magnetic, optical, magnetooptical, or phase-change disk or disk drive; or some form of a semiconductor memory such as ROM, RAM, or flash RAM, such code being instructions (e.g. one or more sequences) executable by an array of logic elements such as a microprocessor or other digital signal processing unit, which may be embedded into a larger device. Thus, the present invention is not intended to be limited to the embodiments shown above but rather is to be accorded the widest scope consistent with the principles and novel features disclosed in any fashion herein.

We claim:

1. A method of data transfer, the method comprising:
   transmitting, to an ONU, an indication of a time relative to a current system time;
   receiving network data collected at the ONU in accordance with the transmitted indication;
   storing the received network data;
   receiving a new system time; and
   resetting at least a portion of the stored network data if a difference between the new system time and a current system time exceeds a predetermined value.

2. The method of claim 1, wherein the resetting includes deleting at least a portion of the stored network data.

* * * * *